United States Patent [19]

Gunton et al.

[11] Patent Number: 4,812,850
[45] Date of Patent: Mar. 14, 1989

[54] METHOD AND APPARATUS FOR COMBINING WAVEFORMS

[75] Inventors: David J. Gunton, Stakeford; Lucy J. Manning, Tyne, both of England

[73] Assignee: British Gas plc, London, England

[21] Appl. No.: 30,749

[22] Filed: Mar. 27, 1987

[30] Foreign Application Priority Data

Mar. 27, 1986 [GB] United Kingdom ................ 8607705

[51] Int. Cl.⁴ ........................ G01S 7/44; G01S 13/06; G01V 3/12
[52] U.S. Cl. ..................................... 342/22; 342/459; 324/329; 324/337
[58] Field of Search ...................... 367/40, 42; 342/22, 342/459, 189, 194, 383, 384, 365; 324/329, 337

[56] References Cited

U.S. PATENT DOCUMENTS 3,775,765 11/1973 Di Piazza et al. .................... 342/22
4,292,635 9/1981 Rittenback .......................... 343/194

FOREIGN PATENT DOCUMENTS 0219577 11/1985 Japan .................................. 342/365
2165701 4/1986 United Kingdom .

OTHER PUBLICATIONS

Robinson et al., *Location and Recognition of Discontinuities in Dielectric Media Using Synthetic RF Pulses*, Procl. IEEE, vol. 62, No. 1, Jan. 1974, pp. 36–44.

Primary Examiner—Thomas H. Tarcza
Assistant Examiner—Gilberto Barron, Jr.
Attorney, Agent, or Firm—Oblon, Fisher, Spivak, McClelland & Maier

[57] ABSTRACT

A method and apparatus for producing data indicative of the presence of buried objects, wherein two waveforms $I(t)$ $Q(t)$ are combined with two reference waveforms $Ir(t)$ $Qr(t)$ using filters 10, 12, 14, 16 of two types A, B. Type A has time response $Ir(-t)$ and type B has time response $Qr(-t)$. The products $\{I(t)@Ir(t)\}\cdot\{Q(t)@Qr(t)\}$ and $\{I(t)@Qr(t)\}\cdot\{Q(t)@Ir(t)\}$ from multipliers 18, 20 are subtracted to give V1 and added to give V2 in the combiner 30. A list of object distances (36) is derived from V1. A list of object orientations (46) is derived from V2. Object times (34) are used to section V2 at (40) on a time basis. A correlation operation is represented by @. The invention is particularly applicable to location of buried pipes using ground probing radar, but is also useful in locating planar objects and in other systems. The waveform combination suppresses noise and clutter. $I(t)$ and $Ir(t)$ are quadrature versions of $Q(t)$ and $Qr(t)$. The emitted radiation is circularly polarized.

11 Claims, 3 Drawing Sheets

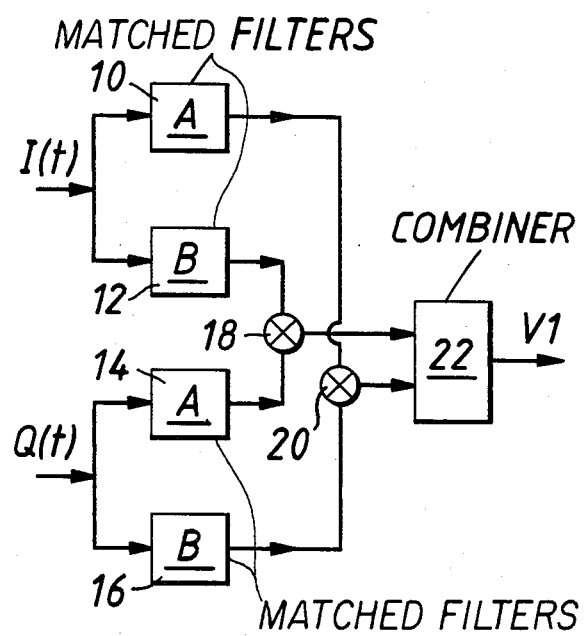

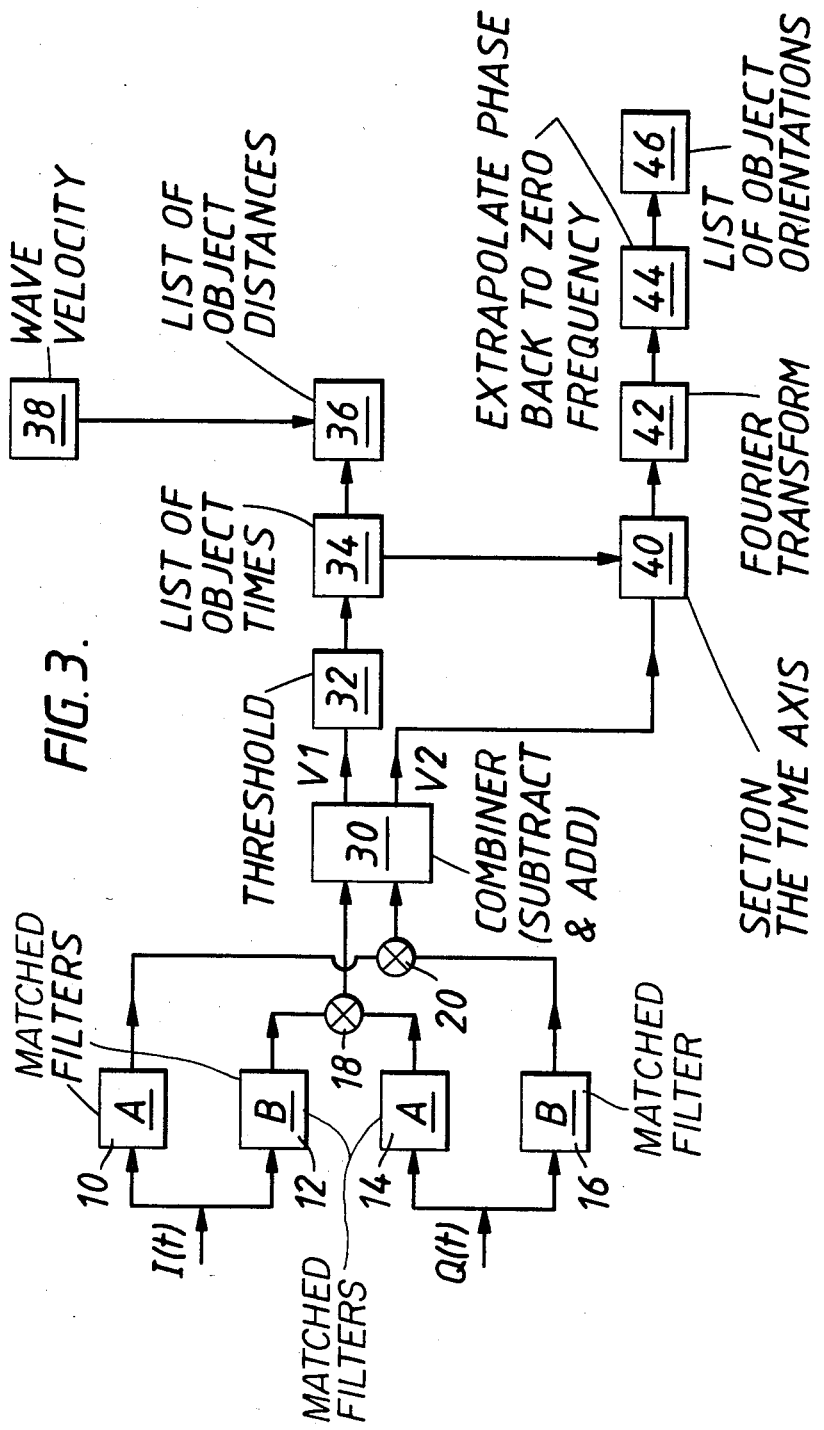

METHOD AND APPARATUS FOR COMBINING WAVEFORMS

The invention relates to methods and apparatus for combining waveforms particularly, though not exclusively, waveforms derived from radiation back-scattered from a reference object and from objects buried under the ground.

The invention is particularly, though not exclusively, applicable to waveforms derived in the course of the use of ground-probing radar to map buried elongated objects such as gas or other pipes and cables using radiation which is circularly polarised, or nearly so, and which is directed into the ground and back-scattered from the buried objects.

Our co-pending patent application, UK Patent Publication No. 2165701A, the contents of which are incorporated herein by reference, describes a ground-probing radar system applicable to the location of buried pipes or other elongated objects.

The object of the present invention is to provide a method and apparatus applicable inter alia to the location of buried objects and which enables the data acquired in the course of searching for such objects to be interpreted more reliably than is possible using the method described in publication No. 2165701A, at least under conditions where the signal to noise ratio is relatively adverse.

According to the invention, a method of combining first and second reference waveforms Ir(t), Qr(t) and first and second further waveforms I(t) Q(t), said second waveforms Qr(t), Q(t) being quadrature versions of said first waveforms Ir(t), I(t) respectively, comprises using a correlation @ and forming the two product waveforms {I(t) @ Ir(t)}·(Q(t) @ Qr(t)}and {I(t) @ Qr(t)}·{Q(t) @ Ir(t)} and combining said products waveforms to produce at least one of the group comprising the difference between said products and the sum of said products.

Preferably, said difference and said sum of said products are produced and the method preferably comprises the further step of using said difference so as to provide a signal which is used to section said sum on a time basis.

According to the invention, filter apparatus for combining first and second reference waveforms Ir(t), Qr(t) with first and second further waveforms I(t), Q(t), said second waveforms Qr(t), Q(t) being quadrature versions of said first waveforms Ir(t), I(t), comprises: first, second, third and fourth filter means having respective inputs receiving I(t), Q(t), I(t), Q(t), respectively, and having respective outputs;

first multiplier means having an output and having two inputs respectively connected to said second and third filter means outputs; second multiplier means having an output and having two inputs respectively connected to said first and fourth filter means outputs; and combiner means connected to said multiplier means outputs and forming the sum of and the difference between signals from said multiplier means and further circuit means connected to said combiner means, said first and third filter means each having a time response which is the time reverse of said first reference waveform Ir(t) and said second and fourth filter means each having a time response which is the time reverse of said second reference waveform Qr(t).

The performance of the method and embodiments of filter apparatus according to the invention will now be described by way of example with reference to the accompanying drawings in which:

FIG. 2 is a schematic block diagram of a first embodiment of apparatus;

FIG. 3 is a schematic block diagram of a second form of apparatus;

Figure 1:
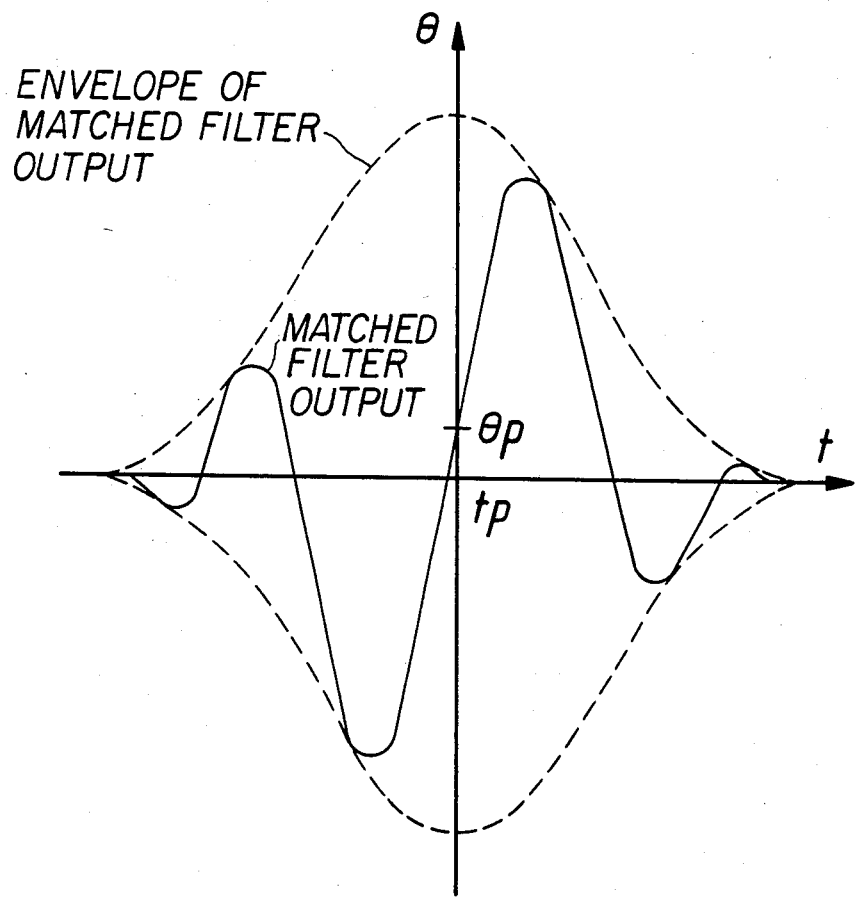
FIG. 1, is a diagram showing a function relating the angle of object orientation to time and showing an envelope of the function.

UK Patent Publication No. 2165701A describes inter alia a procedure for processing data from pipe-locating radar system based on polarisation control. Two reference measurements are made (Ir and Qr) along with two further measurements (I and Q) which may contain the reflected signal from a buried pipe and from these sets of data the depth of the pipe along with its orientation relative to some reference direction could be found. The methods were applicable to transmitted waveforms which had any polarisation state (e.g. linear, circular or elliptical); and although the process particularly described is for two-dimensional matched filtering, it was noted that higher resolution could be obtained (if the signal to noise ratio was high enough) by employing the more general Wiener filter (of which the matched filter is a special case).

The procedures described are adequately practical provided that the signal to noise level is good (even if the Wiener option is not used). Difficulties occur as the signal to noise or signal to clutter ratio becomes smaller and the first casualty is the orientation determination. This is because it relies on having first adequately performed the time domain filtering process to locate the time tp corresponding to the peak of the envelope of the output from the filter. The time tp represents the position of the pipe in time. The diagram as shown in FIG. 1 of the accompanying drawings illustrates the problem. The output function is shown in a full line and the envelope is shown by a broken line. Object orientation θ is plotted as ordinate and time t as abscissa. An ordinate representing object orientation can be imposed at tp. The value of θp, the point at which the function curve crosses the imposed ordinate at tp gives the orientation of a particular object from which the function has been derived.

Except at extreme points, the curve is steep and a small error in tp corresponds to an error in θp which under poor signal to noise conditions, can be so large as to make the result meaningless. Patent Publication No. 2165701A states that a received signal from a buried object illuminated by one antenna and detected by an antenna orthogonally disposed to the first may be written as:

$$F(t)=A(t)+B(t)\sin X+C(t)\cos X+D(t)\sin 2X+E(t)\cos 2X,$$

and that at least five measurements are required to determine the coefficients A, B, C, D and E. The angle X is measured between an arbitrary reference line of the ground and some line on the antenna unit. The time waveforms D(t) and E(t) contain the wanted information about the buried target or targets. In the analysis, these are represented by the symbols I and Q, respectively. Then the signals I', Q' which would appear at the terminals of the receiving antenna if the angle between the reference lines was X+Y are given by:

$$I'+I\cos 2Y+Q\sin 2Y$$

$$Q' = Q\cos 2Y - I\sin 2Y.$$

I and Q, or their rotated combination I' and Q', give a complete description of the parts of the received time waveforms which are characteristic of the buried object or objects. They represent the projections onto orthogonal planes of a three-dimensional time waveform F(t). The publication also explains that reference waveforms may be obtained, using a reference object at a known orientation and distance from the antenna unit. The corresponding three-dimensional time function is Fr(t), and its projections onto the same two orthogonal planes are Ir and Qr.

The pair of functions F(t) and Fr(t), of which I and Q, Ir and Qr are projections onto orthogonal planes are identical, apart from random distortions to F, except that they are, in general, displaced in both angle and time. The publication No. UK 2165701A describes a way of arranging that they become time and orientation coincident through a two-dimensional matched filter. This may be done by constructing F'(t) through rotation of F(t) by an angle Y, as described above, and then, once the time coincidence has been established using conventional one-dimensional matched filtering techniques on the pairs I and Ir, Q and Qr, varying Y so that the cross-correlation product (I'@IR).(Q'@QR)) is a maximum (where @ is the correlation operation). It may be shown that this function gives optimum sensitivity to selection of Y when the reference pair is measured using values for angle X of +22.5 degrees and −22.5 degrees when the ground reference line corresponds to the orientation of the reference object and when the reference line on the antenna unit corresponds to the direction of maximum radiated electric field. Thus, when the radiation is circularly polarised, the choice of values of X is immaterial, but definition of X for the reference measurement is as described, so as to take account of the presence of linearly polarised radiation for which the choice of X affects the results.

The present invention provides a method and apparatus by which objects may be located and, if required, their orientations determined from the envelope of the output of a matched filter. FIG. 2 shows, as an example, one form of apparatus by which the method can be performed to locate a buried object for example. The apparatus consists of: first, second, third, and fourth filters 10, 12, 14, 16, respectively; first and second multipliers 18, 20, respectively; and means combining the outputs from the multipliers 18, 20, in this case a subtractor 22.

As an example, it may be assumed that the method and apparatus are applied to the location of buried objects and that two reference waveforms Ir(t), Qr(t) are derived from electromagnetic radiation back-scattered from a reference object, the incident radiation being circularly polarised or nearly so. Procedures for deriving such reference waveforms are described herein and in Patent Publication No. 2165701A. Each of the filters 10, 14 provides filter facility type A and is designed to have a time response which is the time reverse of the reference waveform Ir(t). Each of the filters 12, 16 provides filter facility type B and is designed to have a time response which is the time reverse of the reference waveform Qr(t).

The filters 10, 12, 14, 16 may be constituted as hardware, such as surface acoustic wave devices, for example. Alternatively, and preferably, the equivalent filter facility may be provided by software by arranging that the sequence of numbers stored in a buffer corresponds to the desired time sequence which constitutes, in the case of the facility equivalent to the filters 10, 14, the waveform Ir(−t) or in the case of the facility equivalent to the filters 12, 16, the waveform Qr(−t).

The inputs to the filters 10, 12 each receive a waveform I(t) and the inputs to the filters 14, 16 each receive a waveform Q(t). The waveforms I(t), Q(t) are further waveforms derived for example from electromagnetic radiation back-scattered from buried objects as described in Patent Publication No. 2165701A.

The apparatus shown in FIG. 2 filters the further waveforms I(t), Q(t) according to the procedure known as cross-convolution. The convolution of a time waveform such as I(t) or Q(t) with for example Ir(−t) is equivalent to the operation known as correlation of that waveform with Ir(t). Thus, the apparatus shown in FIG. 2 produces as its output the envelope which would have been obtained from the basic matched filter but the output is independent of the orientation of the buried object.

The output produced is V1 given by:

$$V1 = (I @ Ir) \cdot (Q @ Qr) - (I @ Qr) \cdot (Q @ Ir)$$

The output discriminates in favour of the inputs I(t) and Q(t) being components of a circularly polarised waveform. If I(t) and Q(t) are linearly related such that $I(t) = k \cdot Q(t)$, where k is a real constant, then V1 is zero. Consequently, the apparatus provides suppression by the basic matched filter of noise or clutter contributions which may have become added to I(t) or Q(t) owing to measurement or system imperfections. Such contributions inherently do not have the correlation between each other which characterise components of a circularly polarised signal. In other words, the necessary correlation that one component shall be the quadrature version, or Hilbert transform, of the other is absent from such contributions.

Another embodiment of apparatus embodying the invention is similar to that shown in FIG. 2 but the means combining the outputs of the multipliers 18, 20 is an adder instead of the subtractor 22. Such an embodiment yields an output V2 given by:

$$V2 = (I @ Ir) \cdot (Q @ Qr) + (I @ Qr) \cdot (Q @ Ir)$$

The output of such apparatus resulting from the output of data derived from a single object is an oscillatory function of time, with a peak in its envelope at a time corresponding to the time at which there is a peak in the output of the apparatus described with reference to FIG. 2.

Either of the embodiments of apparatus described above may be usefully applied without the other. However, it is preferred that their characteristics be combined in a single apparatus as shown for example in FIG. 3.

The components corresponding to those in FIG. 2 are given the same reference number in FIG. 3.

The combining means 30 which receives the outputs of the multipliers 18, 20 is equivalent to both a subtractor and an adder, as described above, and so produces both the output V1 and the output V2 as described above.

The output V1 is a waveform having series of peaks each corresponding to a buried object. The output passes to a circuit section 32 at which the peaks are discriminated in relation to a threshold level. The resultant output passes to a further section 34 where it is used to produce a list of object times each of which is the time taken for the signal emitted from the transmit elements of the antenna to reach the respective object and to return to the receive elements of the antenna. A final section 36 receives the list and also data representative of the velocity of the radiated wave through the ground and produces a list of object distances, each of which is the distance of the respective object from the antenna.

The output V2 passes to a section 40 at which the time axis is sectioned using data from the section 34. This enables data representative of each different object to be treated separately. Next, the successive parts of the output V2, each representative of a respective object, are subjected to Fourier transformation at 42.

The amplitude of the transformed output V2 has, for each object, a peak at some region of the frequency axis. The phase of the transformed output in the same region has a linear frequency variation. Extrapolation of the phase variation back to zero frequency is performed at the next stage 44. This gives an intersection with the phase axis at a certain angle, which is one quarter times the difference between the angular orientation of the respective object (now assumed to be elongated, like a pipe, cable or other long object) and the angular orientation of the reference object (also assumed in this example to be elongated) used to give the back-scattered received radiation from which the reference waveforms $Ir(t)$ and $Qr(t)$ were derived.

The method of the invention is particularly applicable to the mapping of buried elongated objects such as pipes and cables, for example. The preferred apparatus to be used in performing the method is that described above with reference to FIG. 3.

An example of a preferred method and system for mapping such buried objects will now be described.

The complete method comprises (i) the determination of reference waveforms; (ii) survey procedure; and (iii) data processing. It will be understood that although the determination of waveforms is described first in what follows it is not essential that such determination be performed first.

DISCRIMINATION OF REFERENCE WAVEFORMS

The antenna apparatus is arranged so that the radiation is emitted towards the sky and with no metal objects in the vicinity. Cables leading to the apparatus are covered by sheets of microwave-absorbing material.

A reference object in the form of a long metal rod or pipe is suspended approximately one metre above the apparatus. The rod or pipe is horizontal and its midpoint is directly over the antenna apparatus. The length of the rod or pipe is at least 305 mm (1 foot) for each nanosecond of the impulse response of the antenna apparatus. This requirement prevents reflections of the waveform from the ends of the rod or pipe from interfering, on re-radiation and reception, with the directly reflected signal. Typically, for example, the rod or pipe is some 9.15 metres (30 feet) long.

The antenna apparatus is preferably of the kind shown in FIG. 2 of Publication No. 2165701A having spirally-shaped arms having a cladding of lossless dielectric material as described in Publication No. 2165701A and emitting substantially circularly polarised radiation. The boresight axis of the antenna apparatus extends through the centre of the array of spiral arms normal to the plane of the arms and extends vertically through the centre of the reference object.

The antenna apparatus is mechanically rotatable about that vertical axis and is positioned at rest in eight successive angular positions by rotating the apparatus about the axis. The positions are equiangularly-spaced apart by 45°. At each position radiation is emitted from the antenna apparatus and the radiation back-scattered from the reference object produces a received signal at the antenna in the form of a waveform as a function of time. The waveform at each position is recorded, giving eight measurements $Sr1(t) \ldots Sr8(t)$. The emitted radiation is of some ten nanoseconds in duration in which time the frequency of the signal sweeps through a range of from 1000 megahertz to 100 megahertz. The direction of the reference object is marked on the antenna in its 0° position, or is noted.

Two reference waveforms $Ir(t)$, $Qr(t)$ are derived as:

$$Ir(t) = \tfrac{1}{4}\{Sr1(t) - Sr3(t) + Sr5(t) - Sr7(t)\} \text{ and}$$

$$Qr(t) = \tfrac{1}{4}\{Sr2(t) - Sr4(t) + Sr6(t) - Sr8(t)\}$$

SURVEY PROCEDURE

A drum on a 4-wheeled trolley contains the following: antenna apparatus of diameter approximately 400 mm; pulse generator providing a 100 Volt peak and pulse-width of 1 micro-second; receiving circuitry; and analog-to-digital and control electronics. Two umbilical cables extend from the drum to a computer in a van. The computer controls the operation of the mobile equipment and stores the measured data.

The drum is rotatable in the trolley about a vertical axis, with three pre-set stop positions separated by 45° so that, in each position, the antenna apparatus has its boresignt axis vertical and directs radiation downwardly into the ground. The area to be surveyed is marked out into lines using strings. The separation between strings is typically 200 mm. The trolley is moved along each string in turn and is stopped at intervals of typically 100 mm or 200 mm. At each location three measurements are made of the signal back-scattered from the ground and, if present, from buried objects. The measurements are stored as $S1(t), S2(t), S3(t)$ along with details identifying the location.

DATA PROCESSING

Two further waveforms $I(t)$, $Q(t)$ are derived from each set of stored data for each survey location as $$I(t) = \tfrac{1}{2}\{S1(t) - S3(t)\}$$

$$Q(t) = S2(t) - \tfrac{1}{2}\{S1(t) + S3(t)\}$$

These further signals are combined with the reference signals $Ir(t), Qr(t)$ using filtering technique as already explained above so as to give, for each survey location, an indication of the presence of buried elongated objects of their orientations.

For each object, at each location, the presence of the object is indicated by time data representative of the distance of the object from the antenna. When the object, in each case, is a localised object or is an elongated, relatively thin object extending at 90° to the lines of the survey, those distances vary hyperbolically with the change in antenna location along any given line of survey. The depth of any given object is obtained as the product of the minimum time and the velocity of the emitted and reflected waves in the ground.

The invention may be applied to any polarisation of the data. It is preferred that the polarisation be circular or nearly circular. Apart from the location of elongated objects, the invention may be readily applied to locate buried planar interfaces.

The advantages of the present invention are:

(i) a method of determining the orientation of elongated objects is provided which does not depend on knowing the correct location of the objects;

(ii) an easily interpreted, single major peak function, which indicates the position of the object along the time axis is obtained;

(iii) as a result of extraction of the signal components of a polarised waveform noise and clutter levels are much reduced compared with the levels in the received signals;

(iv) as an alternative, the circularly polarised components can be suppressed to retain the linearly polarised ones, so enhancing the effect of signals which correspond to deeper targets. This is because a preferred type of antenna for transmission of circularly polarised signals i.e. a spiral, produces its lowest frequencies in linearly polarised form, and the attenuation properties of the ground result in lower attenuation for lower frequencies.

We claim:

1. A method of producing data indicative of the presence of buried objects using ground probing radar, wherein first and second reference waveforms Ir(t) and Qr(t) have been derived from a radar response to a reference object, said second reference waveform Qr(t) being a quadrature version of said first reference waveform Ir(t), said method comprising:

deriving first and second waveforms I(t) and Q(t) from a radar response to the ground including said objects, said second waveform Q(t) being a quadrature version of said first waveforms I(t);

using a correlation operation @, forming two product waveforms {I(t) @ Ir(t)·Q(t) @ Qr(t)} and {I(t) @ Qr(t)·Q(t) @ Ir(t)}; and combining said product waveforms to produce said data as the difference between said product waveforms.

2. A method according to claim 1, comprising:
producing the sum of said products, and
using said difference so as to provide a signal which is used to section said sum on a time basis.

3. A method according to claim 2, said difference being used to produce time data representing the respective relative distances of objects from a common point, said data being used to provide said signal, said sum after said step effective to section the same being subjected to Fourier transformation and to phase extrapolation to produce further data representative of orientations of said objects.

4. A method according to claims 1, 2 or 3 performed using filtering facilities types A and b, said facility type A acting as a matched filter to said waveform Ir(t) and having an impulse response given by Ir(−t) and said facility type B acting as a matched filter to said waveforms Qr(t) and having an impulse response given by Qr(−t), the method comprising the following steps nor necessarily performed in the order stated:

(i) subjecting said waveform I(t) to the actions of said type A and type B facilities to produce waveforms A1, B1 respectively which are respectively combinations of I(t) with Ir(−t) and with Qr(−t);

(ii) subjecting said waveform Q(t) to the actions of said type A and type B facilities to produce waveforms A2, B2 respectively which are respectively combinations of Q(t) with Ir(−t) and with Qr(−t);

(iii) multiplying said waveform A1 by said waveform B2 and said waveform A2 by said waveform B1 to produce waveforms C1 and C2, respectively; and (iv) combining said waveforms C1 and C2 as aforesaid.

5. A method of producing data indicative of the presence of buried objects using ground probing radar, comprising:

deriving first and second reference waveforms Ir(t) and Qr(t) from a radar response to a reference object;

deriving first and second waveforms I(t) and Q(t) from a radar response to the ground including said objects, said second waveforms Qr(t), Q(t) being quadrature versions of said first waveforms Ir(t), I(t) respectively;

using a correlation operation @, forming two product waveforms{I(t) @ Ir(t)·Q(t) @ Qr(t)} and {I(t) @ Qr(t)·Q(t) @ Ir(t)}; and combining said product waveforms to produce said data as the difference between said product waveforms.

6. A method according to claim 5, comprising:
producing the sum of said products, and
using said difference so as to provide a signal which is used to section said sum on a time basis.

7. A method according to claim 6, said difference being used to produce time data representing the respective relative distances of objects from a common point, said data being used to provide said signal, said sum after said step effective to section the same being subjected to Fourier transformation and to phase extrapolation to produce further data representative of orientations of said objects.

8. A method according to claim 5, 6 or 7 performed using filtering facilities types A and B, said facility type A acting as a matched filter to said waveform Ir(t) and having an impulse response given by Ir(−t) and said facility type B acting as a matched filter to said waveform Qr(t) and having an impulse response given by Qr(−t) the method comprising the following steps not necessarily performed in the order stated:

(i) subjecting said waveform I(t) to the actions of said type A and type B facilities to produce waveforms A1, B1 respectively which are respectively combinations of I(t) with Ir(−t) and with Qr(−t);

(ii) subjecting said waveform Q(t) to the actions of said type A and type B facilities to produce waveforms A2, B2 respectively which are respectively combinations of Q(t) with Ir(−t) and with Qr(−t);

(iii) multiplying said waveform A1 by said waveform B2 and said waveform A2 by said waveform B1 to produce waveforms C1 and C2, respectively; and (iv) combining said waveforms C1 and C2 as aforesaid.

9. A ground probing radar filter apparatus for combining first and second reference waveforms Ir(t) and Qr(t) derived from a radar response to a reference object with first and second further waveforms I(t) and Q(t) derived from a radar response to the ground including buried objects, said second waveforms Qr(t), Q(t) respectively being quadrature versions of said first waveforms Ir(t), I(t), comprising:

first, second, third and fourth filter means having respective inputs receiving I(t), I(t), Q(t), Q(t), respectively, and having respective outputs, said first and third filter means each having a time response which is the time reverse of said first reference waveform Ir(t) and said second and fourth filter means each having a time response which is the time reverse of said second reference waveform Qr(t);

first multiplier means having an output and having two inputs respectively connected to said second and third filter means outputs;

second multiplier means having an output and having two inputs respectively connected to said first and fourth filter means outputs; and combiner means connected to said multiplier means outputs and forming the sum of and the difference between signals from said multiplier means.

10. Apparatus according to claim 9, said combiner means comprising a first output delivering said difference and a second output delivering said sum, said further circuit means comprising:

(i) first means connected to said first output of said combiner means and producing time data representative of the respective relative distances of objects from a common point; and (ii) second means connected to said second output of said combiner means and to said first means, said second means producing data on a time basis sectioned in dependence upon said time data.

11. A method of combining first and second reference waveforms and first and second further waveforms derived in the course of locating buried objects comprising the following steps not necessarily performed in the order stated:

using antenna apparatus to emit radiation which is circularly or nearly circularly polarised and to receive radiation back-scattered from an object or objects;

said apparatus being so used with its transmit and receive elements in a series of different angularly separated positions to produce data;

deriving said two reference waveforms. Ir(t) Qr(t) from data so produced when said object is a reference object;

deriving said two further waveforms I(t), Q(t) from data so produced when each said object or objects is a buried object;

said two reference waveforms and said two further waveforms being quadrature versions of each other;

combining said two reference waveforms and said two further waveforms to produce at least the difference between the product and the product said buried object or each of said buried objects giving rise to a respective peak value of said difference representing a respective value of time, and deriving indications of the position of said buried object or of each said buried object from said respective value of time.

* * * * *